United States Patent
Hu et al.

(10) Patent No.: US 11,290,361 B1
(45) Date of Patent: Mar. 29, 2022

(54) PROGRAMMABLE NETWORK MEASUREMENT ENGINE

(71) Applicant: Xilinx, Inc., San Jose, CA (US)

(72) Inventors: Chengchen Hu, Singapore (SG); Ji Yang, Los Altos, CA (US); Yan Zhang, Singapore (SG); Gordon J. Brebner, Monte Sereno, CA (US); Siyi Qiao, Singapore (SG)

(73) Assignee: XILINX, INC., San Jose, CA (US)

( * ) Notice: Subject to any disclaimer, the term of this patent is extended or adjusted under 35 U.S.C. 154(b) by 98 days.

(21) Appl. No.: 16/716,256

(22) Filed: Dec. 16, 2019

(51) Int. Cl.
*H04L 12/26* (2006.01)
*H04L 43/12* (2022.01)
*H04L 43/10* (2022.01)
*H04L 43/062* (2022.01)
*H04L 43/50* (2022.01)
*H04L 43/028* (2022.01)

(52) U.S. Cl.
CPC ............ *H04L 43/12* (2013.01); *H04L 43/028* (2013.01); *H04L 43/062* (2013.01); *H04L 43/10* (2013.01); *H04L 43/50* (2013.01)

(58) Field of Classification Search
CPC combination set(s) only.
See application file for complete search history.

(56) References Cited

U.S. PATENT DOCUMENTS

| | | | |
|---|---|---|---|
| 2006/0002292 A1* | 1/2006 | Chang | H04L 45/02 370/225 |
| 2009/0086644 A1* | 4/2009 | Kompella | H04L 43/0811 370/248 |
| 2019/0182119 A1* | 6/2019 | Ratkovic | G06F 16/2379 |
| 2020/0162355 A1* | 5/2020 | Zacks | H04L 43/0876 |

OTHER PUBLICATIONS

Hu et al., "Discount Counting for Fast Flow Statistics on Flow Size and Flow Volume," Jun. 2014, IEEE/ACM Transactions on Networking, vol. 22, No. 3, pp. 970-981.
Stanojevic, Rade, "Small Active Counters," 2007, IEEE INFOCOM 2007 proceedings 26th IEEE International Conference on Computer Communications, Washington DC USA, pp. 2153-2161.
Zhao et al., "Design of a Novel Statistics Counter Architecture with Optimal Space and Time Efficiency," Jun. 26-30, 2006, SIGMetrics/Performance '06, Saint Malo, France, pp. 323-334.

* cited by examiner

Primary Examiner — Xavier S Wong
(74) Attorney, Agent, or Firm — Patterson + Sheridan, LLP

(57) ABSTRACT

A device includes a programmable passive measurement hardware engine, a programmable active measurement hardware engine, and a configuration engine. The programmable passive measurement hardware engine is configured to collect statistical data, from data transmission at a network line rate, used for network measurement. The programmable active measurement hardware engine is configured to generate probe packets and wherein the programmable active measurement hardware engine is further configured to collect responses to the generated probe packets, wherein the collected responses are used for the network measurement. The configuration engine is configured to receive data settings and wherein the configuration engine is further configured to program the programmable passive measurement hardware engine and the programmable active measurement hardware engine with the received data settings.

20 Claims, 11 Drawing Sheets

PROGRAMMABLE NETWORK MEASUREMENT ENGINE

TECHNICAL FIELD

The disclosure generally relates to a system for measuring network performance and more particularly to programmable active/passive network measurements.

BACKGROUND

Typically, network measurements provide valuable information regarding network status that can be used for network management, control, and engineering. Different types of network measurements and tasks may be desired and vary from case to case. Accordingly, some reprogram the device, e.g., SmartNIC, switch, middlebox, etc., by integrating a set of required network measurement function, which unfortunately is time consuming with long time to market. Others have suggested an all-in-one approach that integrates all possible measurements with separate data structures and control interfaces, which unfortunately is neither scalable nor flexible in addition to being wasteful since not all measurement features are being used in every case. In contrast, updating all data structures for each incoming packet degrades the processing speed significantly. As such, some have proposed a Counting Bloom Filter Variant (CBFV) approach that involves a passive measurement abstraction. Unfortunately, CBFV is limited to only passive measurements (i.e. collecting and analysing traffic data without injecting extra packets) and does not address any active network measurement (i.e. injecting extra packets, collecting responses and analysing traffic data and responses). Moreover, CBFV does not provide byte-granularity statistics in a traffic flow, hashing in CBFV can only be used for exact specifications and does not support a flexible flow, e.g., wildcard, long prefix matching, range, P4 primitives, etc. Furthermore, the decoding process for resolving hash conflicts in CBFV decoding may be time consuming in addition to the lack of interface design between the control plane and the data plane. Additionally, CBFV cannot operate, by inserting/modifying, on packets to support more sophisticated measurement requirements.

SUMMARY

Accordingly, it is desirable to provide for a flexible programmable architecture for network measurements, e.g., active and/or passive, at a line rate processing within an acceptable statistical error and with minimal impact on other processing by network components, e.g., SmartNIC, switch, middlebox, etc. Moreover, it is advantageous for the flexible programmable architecture to support function changes without a need to pause existing operations for updates. In other words, it is desirable to provide for a flexible programmable architecture that in addition to being fast and efficient it supports programming for network measurements in the control plane that target a network measurement architecture in the data plane, thereby decoupling the architecture and interface of the control plane from that of the data plane of the network measurement functions.

In some embodiments, a device includes a programmable passive measurement hardware engine, a programmable active measurement hardware engine, and a configuration engine. The programmable passive measurement hardware engine is configured to collect statistical data, from data transmission at a network line rate, used for network measurement. The programmable active measurement hardware engine is configured to generate probe packets and wherein the programmable active measurement hardware engine is further configured to collect responses to the generated probe packets, wherein the collected responses are used for the network measurement. The configuration engine is configured to receive data settings and wherein the configuration engine is further configured to program the programmable passive measurement hardware engine and the programmable active measurement hardware engine with the received data settings.

In some embodiments, the programmable passive measurement hardware engine is configured to identify a protocol field of the data transmission based on type-length-value encoding. It is appreciated that in some illustrative examples the device further includes a packet filter is configured to parse packets of the data transmission and wherein the packet filter is further configured to classify the packets using a hashing, or a binary content-addressable memory (BCAM), or a ternary content-addressable memory (TCAM).

According to some embodiments, the programmable passive measurement hardware engine includes a scheduler, a counter update, and a counter array. The scheduler is configured to query the counter array for a counter value. The counter array is configured to return the counter value to the scheduler and the scheduler is further configured to send the counter value and a length associated with a packet to the counter update. The counter update is configured to update a counter value to form an updated counter value and further configured to commit the updated counter value to the counter array. The counter update is configured to update the counter value if the counter value is less than or equal to a first amount and the counter update is configured to update the counter value with a probability if the counter value is greater than the first amount. The counter update may include a random access memory (RAM) that stores a precomputed table used to determine whether the counter value should be incremented. The updated counter value is incrementing the counter value by a length of a packet or by a number of packets if the counter value is less than or equal to the first amount and the updated counter value is incremented by one with the probability if the counter value is greater than the first amount. The scheduler is configured to control switching between the first counter and the second counter of the counter array. In some embodiments, the counter array includes a first counter and a second counter. It is appreciated that one counter in the counter array is active at any given time to update measurement results for incoming traffic and another counter in the counter array provides measurement results.

According to some embodiments, the programmable active measurement hardware engine includes a first memory component, a second memory component, a task scheduler, and a packet generator. The first memory component is configured to store a plurality of templates associated with a plurality of packets, wherein a subset of fields associated with each template of the plurality of templates is filled. The second memory component is configured to store a plurality of tasks associated with a plurality of probes. The task scheduler is configured to schedule a timing for generation of the plurality of probes. The packet generator is configured to generate a probe of the plurality of probes based on the timing by modifying a template of the plurality of templates with a task of the plurality of tasks. The packet generator is further configured to send the generated probe. It is appreciated that the programmable active measurement hardware engine may further include a probe tracker configured to store a task identifier associated with each generated probe and a time that the generated probe is transmitted. The task scheduler is configured to scan a first subset of the plurality of tasks and a second subset of the plurality of tasks in parallel. The task schedule is further configured to push a ready task in the first subset to a first queue and a ready task in the second subset to a second queue. The programmable active measurement hardware engine may further include an arbiter configured to select between the ready task in the first queue and the ready task in the second queue. It is appreciated that a template of the plurality of templates is selected from a group consisting of ICMP PING and TCP SYN.

According to some embodiments, the device may further include a report generation engine configured to receive results from the programmable active measurement hardware engine and the programmable passive measurement hardware engine. The report generation engine is configured to output the network measurement.

These and other aspects may be understood with reference to the following detailed description.

BRIEF DESCRIPTION OF THE DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

To facilitate understanding, identical reference numerals have been used, where possible, to designate identical elements that are common to the figures. It is contemplated that elements of one example may be beneficially incorporated in other examples.

DETAILED DESCRIPTION

Figure 1:
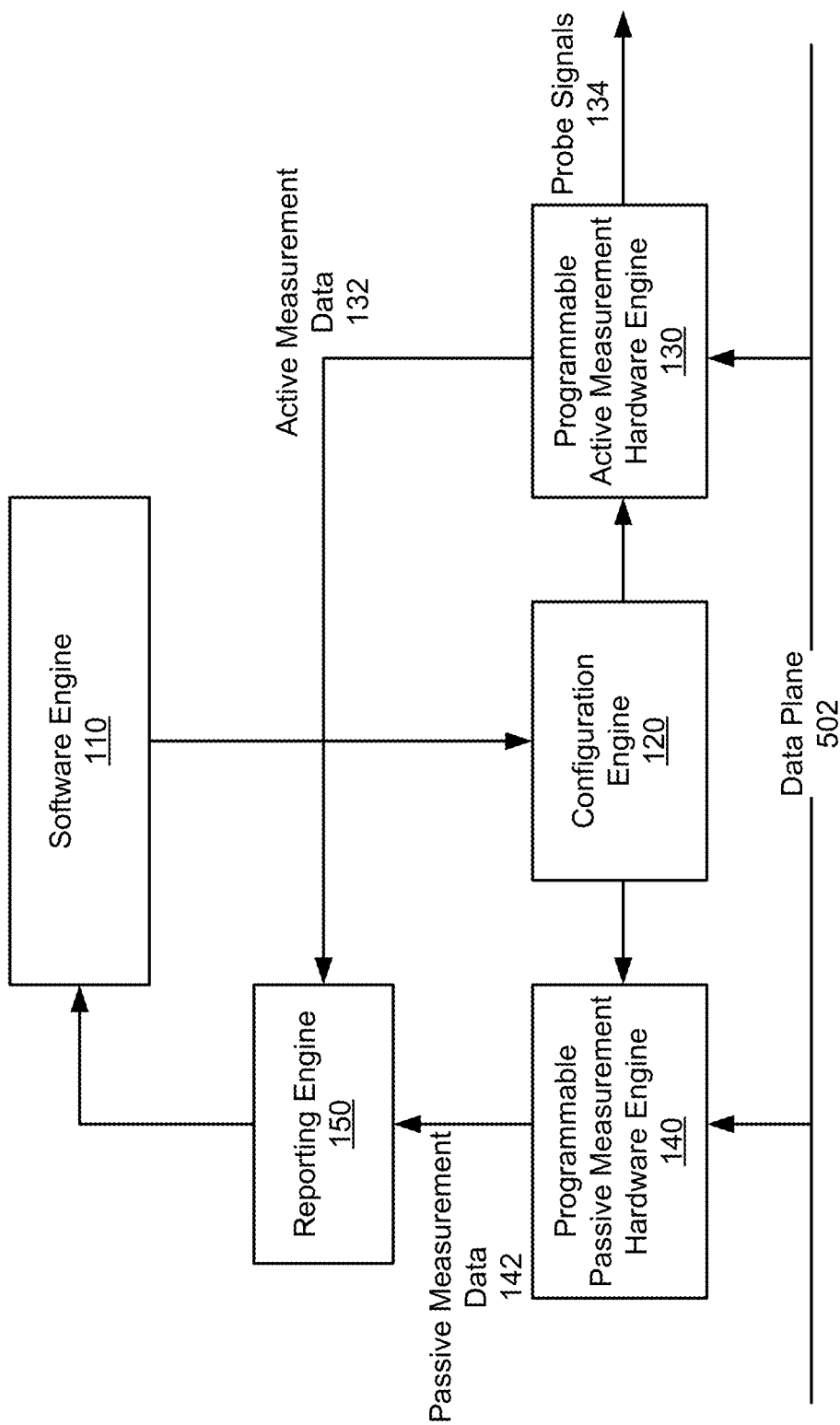
FIG. 1 shows a block diagram depicting a flexible programmable architecture for network measurements, according to some examples.

Examples described herein relate to a flexible programmable architecture for network measurements, e.g., active and/or passive, at a line rate processing within an acceptable statistical error and with minimal impact on other processing by network components, e.g., SmartNIC, switch, middlebox, etc. The flexible programmable architecture supports function changes without a need to pause existing operations for updates. In other words, the flexible programmable architecture, in addition to being fast and efficient, supports programming for network measurements in the control plane that target a network measurement architecture in the data plane. As such, the proposed architecture decouples the interface of the control plane from that of the data plane of the network measurement functions.

The flexible programmable architecture includes a programmable passive hardware measurement engine and an active programmable active hardware measurement engine. The programmable passive hardware measurement engine and the programmable active hardware measurement engine may be configured and programmed using a configuration engine.

The programmable passive hardware measurement engine is configured to maintain the record for a passive measurement abstraction, e.g., bytes, number of packets, etc., for any given packet flow. In other words, the programmable passive hardware measurement engine is configured to match the incoming packets (normal packet flow within the network) against a pre-configured flow table and for a flow of interest (when a packet matches a particular flow) tracks and maintains certain statistical information, e.g., byte size, number of packets (full-size counting, sampling-base counting, sketch-based counting, compressed counting, etc.), etc. In other words, instead of maintaining and tracking results for different measurements separately, the programmable passive hardware measurement engine tracks passive measurement abstraction information. It is appreciated that the flow description may be defined by exact or wildcard matching of a number of protocol fields (identified with a type-length-value (TLV)) encoding scheme. Flow being defined in the proposed fashion is more general than a hash-based, exact matching scheme and therefore measurement results can be generated for an increased number of measurement applications, e.g., flow distribution, top-K query, heavy hitter/changer detection, loss detection, etc., in comparison to the CBFV method. The programmable passive hardware measurement engine is provided in the data plane that can be implemented in SmartNICs, switches, middleboxes, etc., and configured to collect accurate statistical information at a network line rate. The programmable passive hardware measurement engine may be configured to maintain the passive information in a much smaller memory component that is accumulated at the network line rate in comparison to the conventional systems.

The programmable active hardware measurement engine is configured to provide on-demand, high-accuracy network status probing packets without a need to change the hardware implementation. The programmable active hardware measurement engine may be integrated on various devices, e.g., SmartNICs, switches, middleboxes, etc. The programmable active hardware measurement engine addresses shortcomings by software-based measurements, e.g., accuracy, utilization of scarce resource, operation at network line rate, etc. The programmable active hardware measurement engine may be used for managing bare-metal clouds and to facilitate the engineering of virtual machine-based data center networks as well as its application to general network measurements. The programmable active hardware measurement engine leverages templates and tasks that are stored in a memory component and are used by the controller to generate a wide variety of customized probing packets. The template provides a packet format, e.g., packet length, customized field value, timestamp, etc., whereas the task defines how the probing packets are to be sent, e.g., number of probing packets, the time intervals between each probing packet, etc. A packet generator may generate the probing packets based on the template as modified by the task. The programmable active hardware measurement engine may receive response packets to the probing packets that are parsed and filtered by a packet classifier for further processing. It is appreciated that the response packets may be generated and sent by components or devices within the network and in response to receiving the probing packets.

Accordingly, various network measurements can be measured. As an illustrative example the network measurements may include top-K query, heavy hitter/changer detection, bandwidth estimation, loss rate measurement, round-trip time (RTT) measurement, etc.

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the claimed invention or as a limitation on the scope of the claimed invention. For example, various methods according to some examples can include more or fewer operations, and the sequence of operations in various methods according to examples may be different than described herein. In addition, an illustrated example need not have all the aspects or advantages shown. An aspect or an advantage described in conjunction with a particular example is not necessarily limited to that example and can be practiced in any other examples even if not so illustrated or if not so explicitly described.

Some general concepts will first be described to clarify terms and nomenclature used throughout this description.

Referring now to FIG. 1, a block diagram depicting a flexible programmable architecture for network measurements, according to some examples is shown. The flexible programmable architecture includes a software engine 110, a configuration engine 120, an active measurement hardware engine 130, a passive measurement hardware engine 140, and a reporting engine 150. It is appreciated that the software engine 110 is configured to transmit configuration data to the configuration engine 120 such that the active measurement hardware engine 130 and the passive measurement hardware engine 140 can be configured based on the configuration data. The active measurement hardware engine 130 generates and transmits probing packets also referred to as probing signals 134 once it is configured. The passive measurement hardware engine 140 is similarly configured by the configuration data via the configuration engine 120.

It is appreciated that the programmable passive measurement hardware engine 140 maintains the record for active measurement abstraction, e.g., bytes, number of packets, etc., for any given packet flow. In some embodiments the packets from the data plane are matched against a preconfigured flow table and for a flow of interest certain statistical information, e.g., byte size, number of packets (full-size counting, sampling-base counting, sketch-based counting, compressed counting, etc.), etc., is maintained and tracked. It is appreciated that the flow description may be defined by exact or wildcard matching of a number of protocol fields (identified with a type-length-value (TLV)) encoding scheme. Flow being defined in the proposed fashion is more general than a hash-based exact matching scheme and therefore measurement results can be generated for an increased number of measurement applications, e.g., flow distribution, top-K query, heavy hitter/changer detection, loss detection, etc., in comparison to the CBFV method. The programmable passive hardware measurement engine 140 is provided in the data plane that can be implemented in SmartNICs, switches, middleboxes, etc., and configured to collect accurate statistical information at a network line rate. The programmable passive hardware measurement engine 140 may be configured to maintain the passive information in a much smaller memory component that is accumulated at the network line rate in comparison to the conventional systems.

It is appreciated that the programmable active hardware measurement engine 130 leverages templates and tasks that are stored in a memory component and are used by the controller to generate a wide variety of customized probing packets. The template provides a packet format, e.g., packet length, customized field value, timestamp, etc., whereas the task defines how the probing packets are to be sent, e.g., number of probing packets, the time intervals between each probing packet, etc. A packet generator may generate the probing signals 134 based on the template as modified by the task. The programmable active hardware measurement engine 130 may receive response packets to the probing signals 134 that are parsed and filtered by a packet classifier for further processing. It is appreciated that the response packets may be generated and sent by components or devices within the network and in response to receiving the probing packets.

The active measurement data 132 which may be inferred or be result of processing the response packets is transmitted from the programmable active measurement hardware engine 130 to the reporting engine 150. Similarly, the passive measurement data 142 which may be the statistical information or processing of the statistical information may be transmitted from the programmable passive measurement hardware engine 140 to the reporting engine 150. The reporting engine 150 may further process the received active measurement data 132 and/or passive measurement data 142 and integrate the result into a report for rendition to a user. The reporting engine 150 may transmit the report to the software engine 110 for ultimate presentation to a user.

Figure 2:
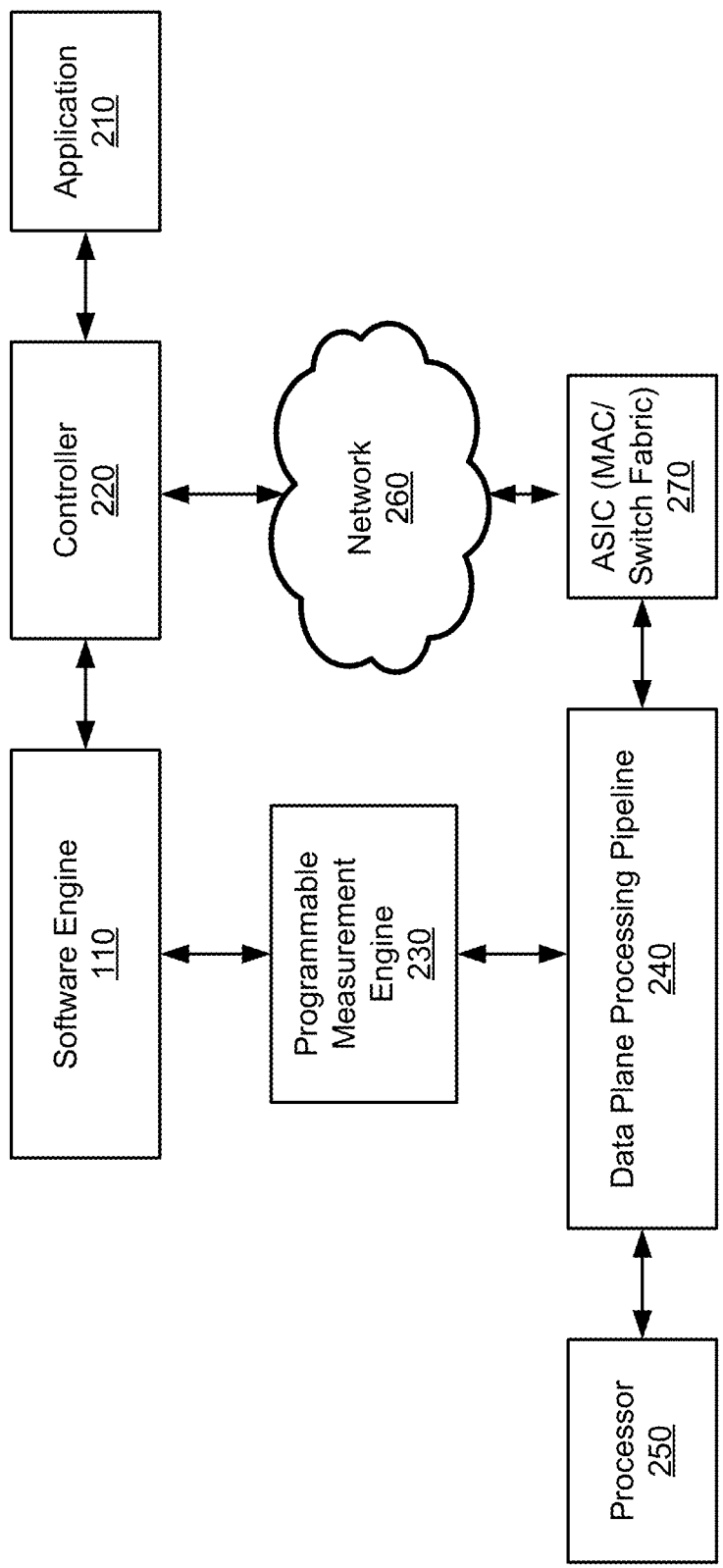
FIG. 2 shows a block diagram depicting programming of a flexible programmable architecture for network measurements, according to some embodiments.

Referring now to FIG. 2, a block diagram depicting programming of a flexible programmable architecture for network measurements, according to some embodiments, is shown. The system includes an application 110 block, e.g., access control, and a controller 220 that are coupled to application specific integrated circuit (ASIC) (MAC/switch fabric) 270 via a network 260. The network data between the application 210 and the controller 220 and the ASIC 270 may go through a data plane processing pipeline 240 and a processor 250 for processing. In some embodiments, a PCIe interface may be used by the network data being exchanged between the processor 250 and the data plane processing pipeline 240. The processor 250 along with the data plane processing pipeline 240 and/or ASIC 270 may be a system or device being in network communication with the controller 220 and the application 210, and exchange packets associated therewith. It is appreciated that a programmable measurement engine 230 may be coupled to the data plane processing pipeline 240 in order to perform various active and passive data measurements, as discussed above. The programmable measurement engine 230 may include the programmable passive hardware measurement engine 140 and/or the programmable active hardware measurement engine 130. It is appreciated that the programmable measurement engine 230 may be configured with configuration data (e.g. data setting) using the software engine 110 that receives the data setting from the controller 220 that is in communication with the application 210. In other words, the programmable measurement engine 140 is connected to a remote controller or a local host server using the software engine 110. The programmable measurement engine 230 may be integrated within a SmartNIC, a switch, a middlebox, etc. In some embodiments, the software engine 110 may communicate with the controller 220 and the application 210 using gRPC/p4runtime. It is appreciated that the interface, as shown below, may use protocol buffers to encapsulate the messages during runtime.

WritePassiveMeasurementTask
    Description    Assign a passive measurement task to agent. After parsing the task message, the agent configures the hardware accordingly.
RemovePassiveMeasurementTask
    Description    Remove the specified passive measurement task.
ReadPassiveMeasurementResult
    Description    Read passive measurement results.

-continued

AddPacketTemplate
    Description    Submit a packet template from remote controller to agent, which is then stored in hardware. The packet template is filled by the controller.
RemovePacketTemplate
    Description    Delete existing packet templates from hardware.
SetMeasurementConfig
    Description    Configure measurement engines.
GetMeasurementConfig
    Description    Get the measurement engine configurations.
WriteActiveMeasurementTask
    Description    Assign an active measurement task to agent. After parsing the task message, the agent configures the hardware accordingly.
RemoveActiveMeasurementTask
    Description    Remove the specified active measurement task.
ReadActiveMeasurementResult
    Description    Read active measurement results by task ID.

It is appreciated that in some embodiments the controller 220, e.g., a remote controller, may assign measurement tasks. The measurement tasks are transmitted from the controller to the software engine 110 based on flow granularity. The flow may be defined as by exact or wildcard matching of a number of protocol fields (identified with a type-length-value (TLV)) encoding scheme. The software engine 110 may program the programmable measurement engine 230, e.g., using configuration engine, in order to collect measurement results, e.g., flow size/bytes, number of packets, extracted packet fields in probing signals, probe acknowledgement, etc., at network line rate. The programmable measurement engine 230 passes on the collected data to the software engine 110 which passes the measurement data to the controller 220 for processing. The controller 220 may then calculate further information, e.g., statistics, etc., on the received information. It is appreciated that in some embodiments, the software engine 110 and/or the programmable measurement engine 230 may provide atomic operations on the measurement results, e.g., using reporting engine 150, in order to offload part of the post-processing to the programmable measurement engine 230 for better performance.

In one illustrative example, the controller 220 may initialize the measurement, e.g., passive measurement, runtime. Subsequent to the initialization the controller 220 may assign measurement tasks and start a thread to read the results stream. The following code snippet illustrates the steps.

```
def run():
    """Run the above function via grpc"""
    # Set the ip and port connected to the server, which must be consistent with the server.
    with grpc.insecure_channel('192.168.0.11:50051') as channel:
        stub = MeasurementTask_pb2_grps.MeasurementRuntimeStub(channel)
        print("--------------WritePassiveMeasurementTask---------")
        # Pass the passive measurement task, specify req-id, device id, task type, filter type,
        # reporting period, and memory limit are 0, 0, 2, 1, 1 seond, 100kB respectively.
        task_id = WritePassiveMeasurementTask(stub, 0, 0, 2, 1, 1, 100)
        print("get task_id:%s " % task_id)
        print("---------------ReadPassiveMeasurementTask---------")
        # Enable the thread to obtain the passive measurement data result in real time,
        # specify the request id, task id, device id are 0, task_id, 0
        writeresult = threading.Thread(
            target=ReadPassiveMeasurementResult, name='StartStoreResult', args=(stub,
        0, task_id,0)
        writeresult.start()
        print("--------------------ReadResult----------------")
        # Wait 5 seconds to get new data
        time.sleep(5)
        # Get the data result thread to write the result in real time, execute the drawing
        # program, read the result in real time, and display it dynamically
        ani = animation.FuncAnimation(fig, animate, interval=1000)
```

```
plt.show()
print("---------------RemovePassiveMeasurementTask----------")
RemovePassiveMeasurementTask(stub, task_id, 0)
```

In some embodiments, the collected results may be processed by a user defined function, e.g., detecting heavy-hitters/heavy-changers, etc. The following code snippet illustrates the steps.

```
def Heavy_Hitter(flow_index, decounter):
    """"Check whether HH occurs according to the counter value of the current stream . . .""""
    heavy_hitter = decounter
    # When the counter value is greater than a certain threshold, the current
    # judgement result in saved as True, otherwise it is empty.
    If heavy_hitter > HEAVY_HITTER:
        result[flow_tuple_dic[flow_index]][1] = True
    else:
        result[flow_tuple_dic[flow_index]][1] = ""
    # Delete the first historical data in the saved counter result, and save the current
    counter value in the end of the list.
    del result[flow_tuple_dic[flow_index]][0][0]
    result[flow_tuple_dic[flow_index]][0].append(heavy_hitter)
def Heavy_Changer(flow_index, decounter):
    """"Check whether HC occurs according to the counter value of the current stream.""""
    # Calculate the difference between the current period and the previous period to get
    the changed value
    heavy_charger = abs(decounter - flow_map[flow_tuple_dic[flow_index]])
    # When the change is greater than a certain threshold, save the current judgement
    result as True, otherwise it is empty.
    if heavy_charger > HEAVY_CHARGER:
        heavy_charger_result[flow_tuple_dic[flow_index]][1] = True
    else:
        heavy_charger_result[flow_tuple_dic[flow_index]]1[1] = ""
    # Save the calculated change value in the HC result variable
    heavy_changer_result[flow_tuple_dic[flow_index]][0] = heavy_changer
    # Save the current counter of the stream to the corresponding position of the flow
    #flow_map corresponding to the stream for the calculation of the next period
    flow_map[flow_tuple_dic[flow_index]] = decounter
```

In one illustrative example, illegal port access and/or detecting a port scanning may be tracked. The following code snippet illustrates the steps.

```
def Port_Access(flow_index, decounter):
    """"Check whether the port is forbidden from being accessed according to the counter
    value of the current stream.""""
    # If the counter value of the stream monitored by the task is greater than 0, it means
    that the packet is sent to the port,
    # that is, the port that is forbidden to access is accessed, the counter value is reserved,
    and the value is set to True.
    if decounter > 0:
        port_access_result[flow_tuple_dic[flow_index]] = decounter
        port_access_alarm[flow_tuple_dic[flow_index]] = True
    else:
        port_access_result[flow_tuple_dic[flow_index]] = 0
        port_access_alarm[flow_tuple_dic[flow_index]] = ""
def One_Port_Scan(flow_index, decounter):
    """"Detect whether a port scan occurs based on the counter value of the current
    stream.""""
    # If the counter value of the stream detected by the task is greater than 0, it means that
    a packet is sent to the port,
    # that is, the port may be scanned. Number of scans +1, record the counter value
    if decounter > 0:
        port_scan_count[flow_tuple_dic[flow_index]] += 1
        port_scan_sum_result[flow_tuple_dic[flow_index]] += decounter
    else:
        port_scan_count[flow_tuple_dic[flow_index]] = 0
        port_scan_sum_result[flow_tuple_dic[flow_index]] = 0
def Port_Scan_Threshold():
    """"After a period is over, the number of port scans is judged. If a threshold is
    greater than a certain threshold, a port scan occurs on an ip.""""
    for key, value in port_scan_count.items():
```

```
if value > PSNUMBER:
    port_scan_result[key] = True
else:
    port_scan_result[key] = ""
```

Accordingly, the proposed architecture, as described above, decouples the programmability into the control plane and data plane. It is appreciated that the passive and active measurement hardware are integrated into the data plane thereby providing network line rate processing. As such, the interface and messages are used in the control plane to enable network measurement based applications.

Figure 3:
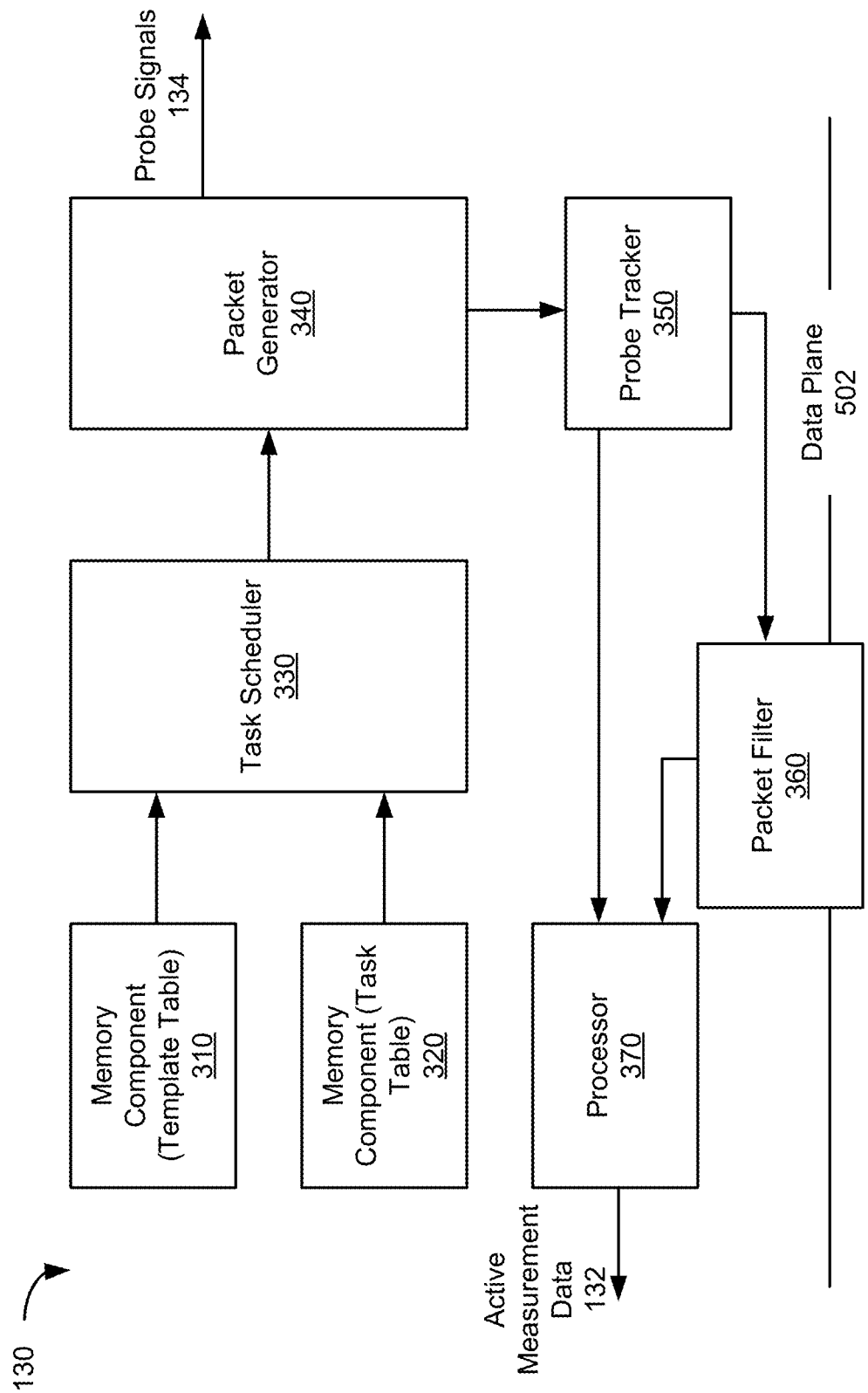
FIG. 3 shows a block diagram depicting a programmable active hardware measurement engine, according to some examples.

Referring now to FIG. 3, a block diagram depicting a programmable active hardware measurement engine 130, according to some examples, is shown. The architecture of the programmable active hardware measurement engine, as described, addresses shortcomings of the software based measurement, e.g., inaccuracies in timestamping and measurement, scheduling uncertainties, probe generation with small inter-probe delay, competing for valuable resources such as Central Processing Units (CPUs) and high precision event timer (HPET) with tenant applications, etc. The emergence of SmartNICs have provided the capability to offload measurement to SmartNICs rather than it being handled by software only. However, changing or extending the packet probing signals usually requires the register transfer level (RTL) to be updated, which is not only time consuming but also error-prone. The programmable active hardware measurement engine, as described, provides a flexible but yet low bandwidth solution for generating probing packets without competing for valuable resources where the probing packets are generated with accurate timestamping and measurement, scheduling certainties, and probing signal generation with small inter-probe delay.

The programmable active hardware measurement engine 130 may include a memory component 310, a memory component 320, a task scheduler 330, a packet generator 340, a probe tracker 350, a packet filter 360 component, and optionally a processor 370. It is appreciated that the memory component 310 may store template tables while memory component 320 may store task tables. It is appreciated that in some embodiments, an application programming interface (API) such as the software engine 110 may be used to configure the template table and the task table stored in the memory components 310 and 320. The task table stored in the memory component 310 is scanned by the task scheduler 330 and once a ready task is read, the task scheduler 330 reads out the associated template. The task scheduler 330 may pass on the task and the associated template to the packet generator 340. The task scheduler 330 ensures that the probing signals 134 are generated with accurate timing.

The packet generator 340 modifies the template with the task and generates the probing signals (also referred to as probing packets) 134. It is appreciated that the packet generator 340 may include a packet parser and an editor. The packet parser may recognize the template, e.g., Internet Control Message Protocol (ICMP) PING, Transmission Control Protocol (TCP) SYN, etc. It is appreciated that a key may be generated by the packet generator 340 for each probing signal. For example, a source IP address, the destination IP address and the protocol type may be used as the key for ICMP PING template. In comparison, a five-tuple may be used for TCP SYN. It is appreciated that the editor may be used to modifies the input template to generate the probing signals. In some embodiments, the editor may be used to update the checksums in the packet headers. The generated key may be used to uniquely identify each probing signal/packet and/or a response thereto. The probing signals 134 are merged onto the egress traffic.

The probe tracker 350 tracks each probing signal by tracking sending time of each probing signal and tracking its task ID. The probe tracker 350 may be a binary content-addressable memory (CAM) that is queried using probe keys. For each probing signal/packet, the probe tracker stores the task ID and the sending time. It is appreciated that each entry in the CAM may have an expiration time associated therewith upon expiration of which the probing signal/packet being tracked by the probe tracker 350 is removed. The packet filter 360 inspects the received network packets at network line rate. The packet filter 360 may include a packet parser and/or a lookup engine. A probe response is detected if the packet filter 360 recognizes a packet response once the received packets are parsed and if a generated key (previously generated when the probing signal was generated and sent) is detected by looking it up. A receipt time for the packet response may be recorded. If a probe response is detected, its respective task ID and sending time may be retrieved and sent to the processor 370 for further processing. If the packet filter 360 does not recognize the packet, then the packet is released back to the packet pipeline. It is appreciated that the result of the processing by the processor 370 generates the active measurement data 132 which is subsequently sent to the reporting engine 150, as described above. In some embodiments, the processor 370 supports a range of implementations including simple NOP to RISC-like processor where it uses the collected measurement data and applies operations defined in the tasks, e.g., computing RTT by calculating the difference between the receiving and sending time, etc. It is appreciated that the processor 370 may further receive additional information, e.g., whether a probing signal/packet being tracked by the probe tracker 350 has been removed after expiration of time.

In some embodiments, the memory components 310 and 320 may be separate memory components or may be a single memory component but storing the template table and the task table. The template provides a packet format, e.g., packet length, customized field value, timestamp, etc., whereas the task defines how the probing packets are to be sent, e.g., number of probing packets, the time intervals between each probing packet, etc. It is appreciated that the template may be a certain type of packet where certain fields are filled out whereas tasks define the manner in which the template is to be modified to generate one or more probing packets or signals. For example, a template may contain all the fields of ICMP echo request. Accordingly, in order to send a PING probe to a range of IP addresses, a task that replaces the destination IP address of the template with each address in the range may be used. Thus, each time a task is being executed, a probing signal with a different destination IP address is generated.

In some embodiments, a task may be defined as periodic, burst, or reactive. A periodic task generates a probing signal/packet with a specified inter-probe delay whereas a burst task is executed once and sends a series of back-to-back probing signals/packets. In contrast, a reactive task is triggered when a particular kind of packet is received. It is appreciated that in order to define a task, a task type, a template ID, template fields to be modified and the range of field values, inter-probe delay (for periodic tasks only), burst length (for burst task only), and timeout period may be defined. Below is an illustrative example of tasks and templates.

| Type | Name | Description |
| --- | --- | --- |
| Task | Task mode | Send probes in a burst, or periodically, or reactively |
| | Probe frequency | The time interval between each two probes. The interval is set to 0 for burst mode and a MAXIMUM value for the reactive mode. |
| | Number of probes | The number of probes that will be sent |
| Templates | Packet type | Define the type of packets, e.g., ethernet packet, ICMP packet, ect. |
| | Field value s | Fixed field values can be pre-defined in packet templated includung header and payload. |
| | Fields to be modified | The fields need to be modified on the template, whose position is identified by offset and length. |
| | Initial modification value | The first probe will be modified with this value on a specified modified field. |
| | Modification step | Support additive value modification on a specify field and the step could be positive or negative. For example, the source IP address (Fields to be modified) is set to 192.168.0.1 (Initial modification value) for the first probe and decreases by 8 (modification step is −8) for the next packets. |
| | Time-Stamp generation | Generate the system time stamp, which is useful for calculating the measurement metric of round-trip time. |

It is appreciated that the templates and/or tasks may be part of the data setting or configuration data being provided by the controller 220 to the software engine 110 and the configuration engine 120. It is appreciated that in some embodiments, the template table stored in the memory component 310 and/or the task table stored in memory component 320 may be initiated by the controller 220 and configured via the configuration engine 120. It is appreciated that in one illustrative embodiment, a hardware module (not shown) exposes registers as well as template and task configuration words and buffers. In one embodiment, inserting or removing a task or template is applied through configuration words where buffers may be used to temporarily store the definition and where they are written into the template/task tables all at once. It is appreciated that every template and/or task may be guarded with a valid bit that is set when inserted and unset before it is removed. In some embodiments, the tasks may be queried for their running status. It is appreciated that in one illustrative example, the template/task table can be changed during a time when the task scheduler 330 is running.

Figure 4:
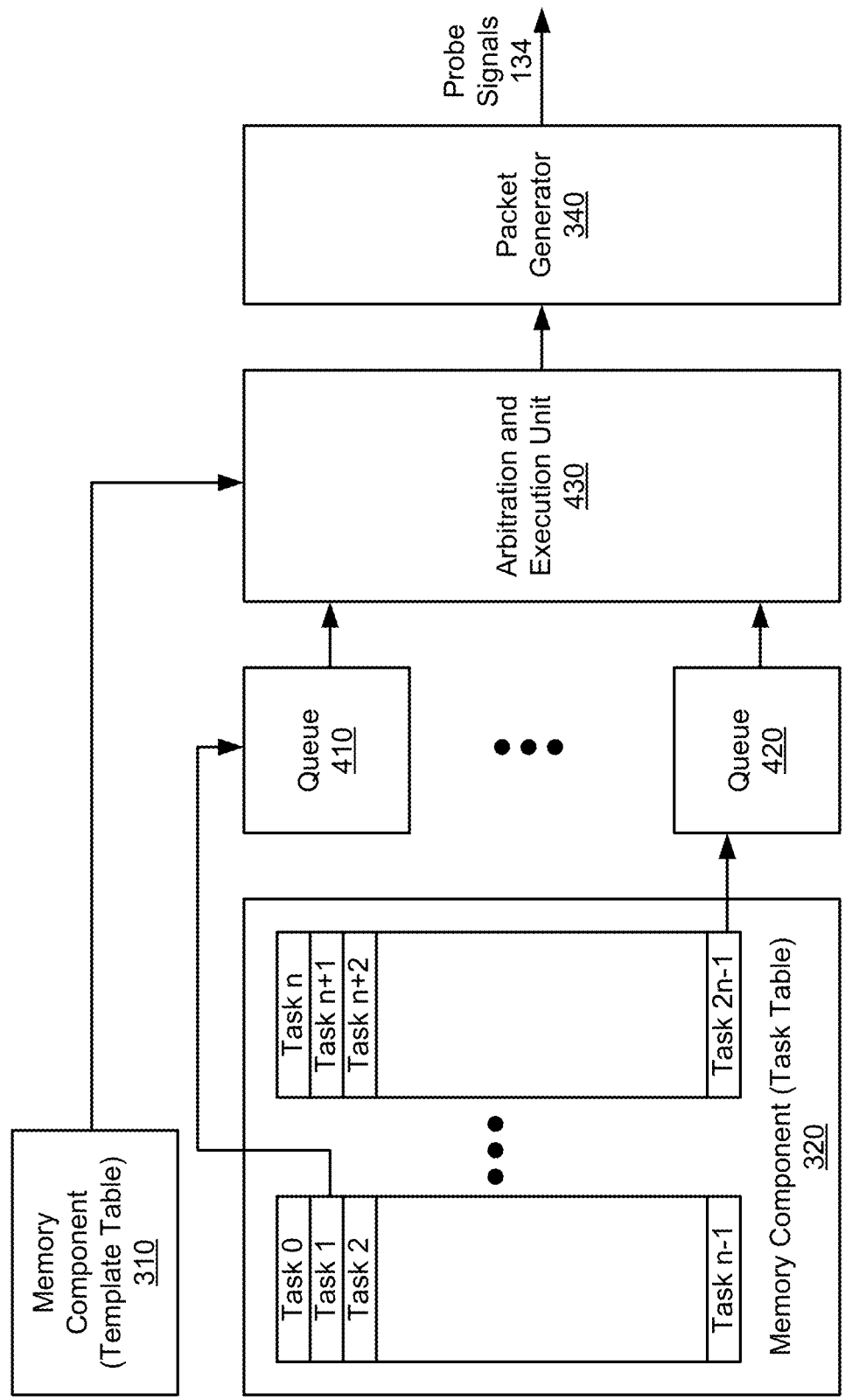
FIG. 4 shows a block diagram depicting an architecture for scheduling tasks in a programmable active hardware measurement engine, according to some examples.

Referring now to FIG. 4, a block diagram depicting an architecture for scheduling tasks in a programmable active hardware measurement engine, according to some examples is shown. In this illustrative embodiment, the operation of the task scheduler 330 is described. The memory component 320 may store multiple tasks, e.g., task 0 through task n−1, task n through task 2n−1, etc. It is appreciated that the tasks stored in the memory component 320 (Task Table) is scanned to identify ready tasks. Most clock cycles contain no ready tasks since the probing signals 134 are generated at a much lower frequency in comparison to the clocking frequency and the bandwidth used by the probing signals 134 is a small percentage of the total available bandwidth. When a ready task is identified it is transmitted to a queue, e.g., queue 410, queue 420, etc. It is appreciated that any number of queues may be used and the number of queues illustrated is for illustrative purposes only. In this illustrative embodiment, task 1 is a ready task and is stored in queue 410 whereas tasks 2n−1 is also a ready task that is stored in queue 420. In other words, the task scheduler 330 scans each group of task entries in parallel and pushes the ready tasks to their corresponding queues. Each queue is therefore linked to a group of task entries.

In some embodiments, an arbitration and execution unit 430 determines which task to run next, e.g., based on chronological order, priority, etc. The arbitration and execution unit 430 also receives the template from the memory component 310 that stores the template tables. Thus, the appropriate template along with the task are passed on to the packet generator 340 to generate the probing signals 134. It is appreciated that the process continues until all tasks are processed.

It is appreciated that the response packets received as a result of the probing signals 134, as described above are processed. The packet generator 150 may generate a report that contains the task ID, the probing signal sending time, the probing signal response time, etc. The collected data may be further processed. For example, for a periodic task the difference between the sending time of the probing signal and the receiving time of the response to the probing signal may be determined to obtain an unbiased estimator of the RTT. As another example, for burst tasks, since probing signals are sent back-to-back, the difference between the receiving time for the responses to the probing signals can be calculated to estimate the end-to-end bandwidth. In one illustrative embodiment, a tracker-triggered report may include only the task ID and the probing signal's sending time and it may indicate that the probe signal has expired and that it is generated regardless of whether a response to the probing signal is received.

Accordingly, various network measurements can be measured, e.g., network latency, network bandwidth, etc. In one illustrative example, a server-to-server latency can be measured across an entire data center with more accurate measurement in comparison to software-measured approach, its bandwidth can be better controlled and utilized, and it can be used on bare-metal machines. As yet another example, the described embodiments can be used for remote status query, e.g., state of the remote machine such as CPU utilization memory consumption, available network bandwidth, etc., by customizing probing signals to encode queries and to collect responses to the probing signals to extract and compile into a report.

The described embodiments send and receive the probing signals and responses thereto in hardware, thereby guaranteeing measurement accuracy. The task scheduler, as described, is scalable and supports measurement tasks with small inter-probe delays with back-to-back probes. It is further appreciated that the architecture of the embodiments, as described, can be built on existing components, e.g., SmartNIC, switches, middlebox, etc., and therefore are well-suited for network management for data centers, as an example. Furthermore, the flexibility of data processing capability enables the collected measurement data to be reported without processing.

Passive network measurement in accordance with some embodiments is described next. Passive network measurement examines network traffic packets to collect statistical data without impacting the network status. Passive network measurement provides valuable networking operations, diagnosis, planning, engineering, accounting, control and security. In the conventional systems, a full size counter, e.g., DRAM, has been used for updating and reading but is unfortunately limited due to space. Other conventional systems have used a hybrid of SRAM and DRAM, e.g., storing lower order bits in SRAM and the entire bits in DRAM, but that too suffers from limited counter reading speed and significant communication traffic among CPU, SRAM, and DRAM. Yet, other conventional systems have used only SRAM and random sampling to control the memory consumption. Unfortunately, random sampling leads to inaccuracies. Some conventional systems have used Small Active counters (SAC) to maintain parameters for each counter and reduce total memory usage but this method unfortunately requires re-normalization of counter values as extra processing overhead. Accordingly, some have used discount counting (DISCO) to count flows by introducing non-linear counter update function but that has proven difficult to achieve at network in-line rate.

In other words, the conventional systems providing passive network measurement fail to provide passive measurement at network in-line rate, utilize large memory sizes, and are not generic enough to support diverse measurement requirements. The proposed passive measurement architecture provides passive measurement at network in-line rate, utilizes small memory sizes, and supports diverse network measurements.

Figure 5:
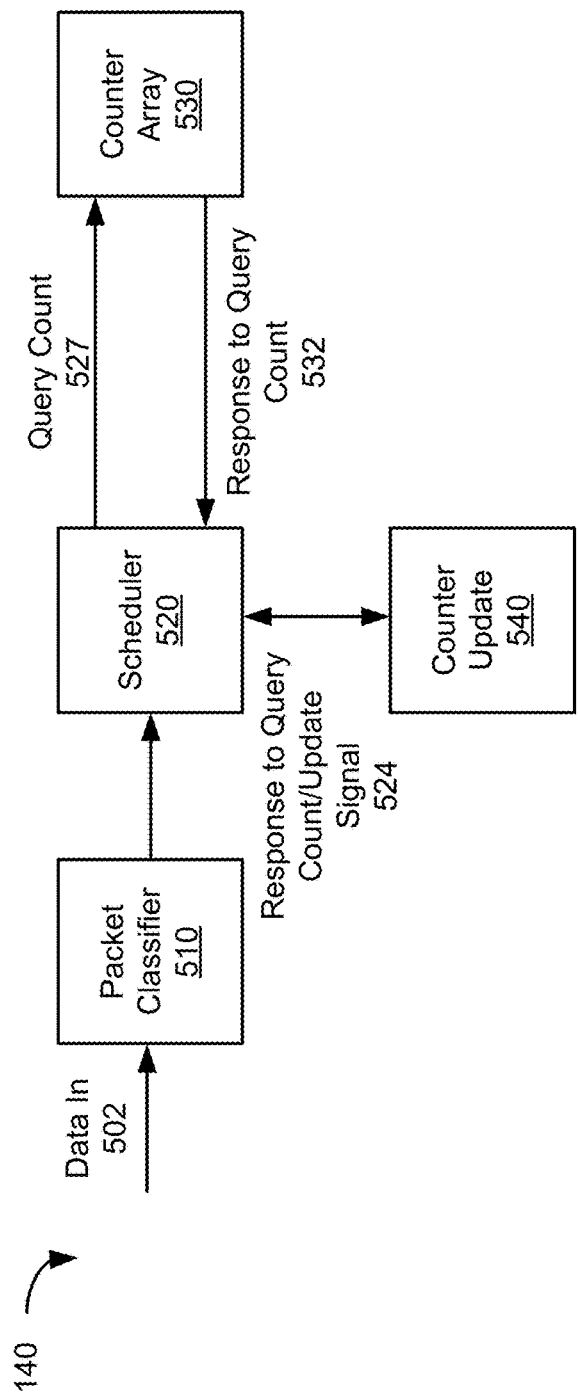
FIG. 5 shows a block diagram depicting a programmable passive hardware measurement engine, according to some examples.

Referring now to FIG. 5, a block diagram depicting a programmable passive hardware measurement engine, according to some examples is shown. Network data 502 is received by a packet classifier 510. The packet classifier 510 identifies a packet class and sends the information to the scheduler 520. The scheduler 520 queries the counter array 530 to obtain the count value, which once received is transmitted to the counter update 540 module for updating.

The packet classifier 510 assigns a flow ID to the received data in 502 packet (e.g., based on a flow classification configuration). It is appreciated that the measurement results may be based on flows as defined by exact or wildcard matching of a number of protocol fields that may be identified with a type-length-value (TLV) encoding scheme. The packet classifier 510 may parse the packet and extract various information from the packet, e.g., packet length, number of packets within a flow, number of bytes of the packet, etc. The packet classifier 510 may use hashing, binary content-addressable memory (BCAM), a ternary content-addressable memory (TCAM), etc., to classify the packet. Once the packet is classified, the classified packet is sent to the scheduler 520. For example, the flow ID for the packet along with the packet length or other measurement metadata may be sent to the scheduler 520. The scheduler 520 uses the flow ID to query counter 527 value from the counter array 530. The counter array 530 sends a response to the query count 532 that includes the counter value to the scheduler 520. The scheduler 520 may then send a response to query count/update signal 524 that includes the received counter value along with the packet length or other measurement metadata to the counter update 540 module to update the counter value. Once updated, the counter update 540 sends a response to query count/update signal 524 to the scheduler 520 which commits it back to the counter array 530.

Figure 6:
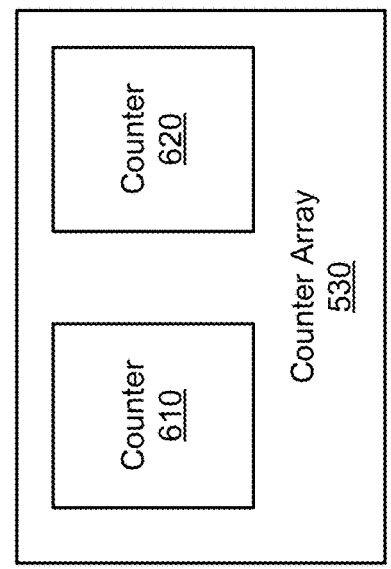
FIG. 6 shows a block diagram of a counter array in a programmable passive hardware measurement engine, according to some examples.

Referring now to FIG. 6, a block diagram of a counter array in a programmable passive hardware measurement engine, according to some examples, is shown. In some embodiments, the counter array 530 may include multiple counters, e.g., counter 610, counter 620, etc. In this illustrative embodiment, two counters are used. According to some embodiments, at any given time, only one counter is active at a time for updating the measurement results for incoming network traffic while the other counter passes the results to the control plane. In some embodiments, the scheduler 520 controls the switching between the counters 610 and 620 in the counter array 530, thereby ensuring that the paging result does not block the runtime measurement process. It is appreciated that the counters switch status when the active counter in charge of updating is about to overflow. In some embodiments, a precomputing of the timeout ensures that paging is complete before switching the status of the counters.

Figure 7A:
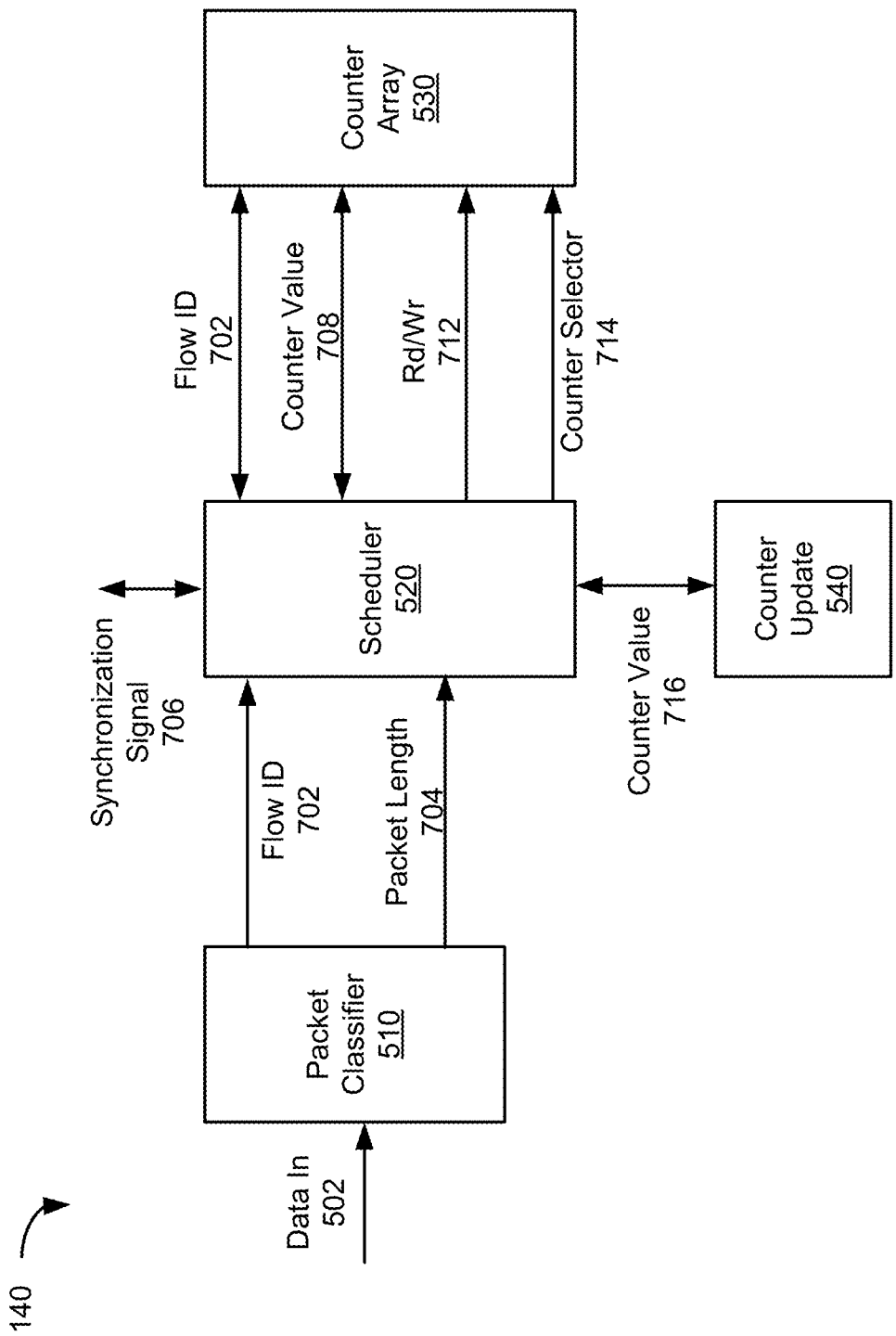
FIG. 7A shows an operation of a programmable passive hardware measurement engine, according to some examples.

Referring now to FIG. 7A, an operation of a programmable passive hardware measurement engine, according to some examples is shown. FIG. 7A is substantially similar to that of FIG. 5. The packet classifier 510 may send the flow ID 702 and packet length 704, as described above, to the scheduler 520. The scheduler 520 receives a synchronization signal 706 and in response thereto, sends the flow ID 702 to the counter array 530. The scheduler 520 also sends a signal rd/wr 712 that determines whether the scheduler 520 is querying the counter array 530 for the counter value or whether it is committing the update counter value. At this step, the scheduler 520 sends a read 712 signal to query the counter array 530 for the counter value associated with the flow ID 702. The scheduler 520 also sends a counter selector 714 to identify the active counter within the counter array 530, as described above. In response, the counter array 530 sends the counter value 708 to the scheduler 520. The scheduler 520 sends the counter value 716 along with the flow ID to the counter update 530 in order to update the counter value. The updated value, hence counter value 716, is transmitted from the counter update 540 to the scheduler 520. The scheduler 520 now sends the flow ID 702, the update counter value 708, a write signal 712, and the counter selector 714 to commit the updated counter value to the appropriate counter within the counter array 530.

Figure 7B:
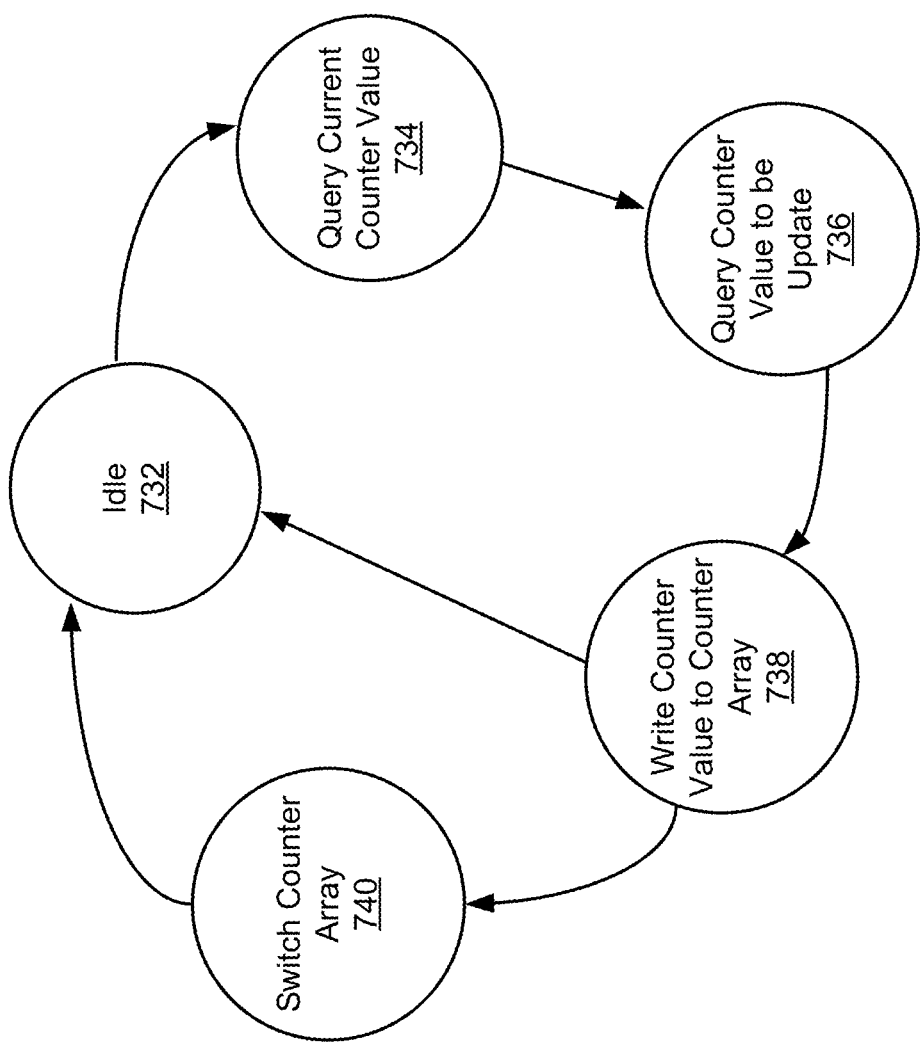
FIG. 7B shows a state machine of the operation in a programmable passive hardware measurement engine, according to some examples.

Referring now to FIG. 7B, a state machine of the operation in a programmable passive hardware measurement engine, according to some examples, is shown. At step 732, the system is idle. Once incoming network packets are received, the system sends a query for current counter value 734, e.g., by scheduler 520 to the counter array 530. Once the counter value is received, at 736, a query to update the counter value is submitted, e.g., from the scheduler 520 the counter update 540. At 738, the updated counter value is written to the counter array. If no other packets are received the system returns to the idle 732 state. Otherwise, if one of the counters in the counter array is about to overflow, then the counters within the array may be switched, at step 740.

Figure 8A:
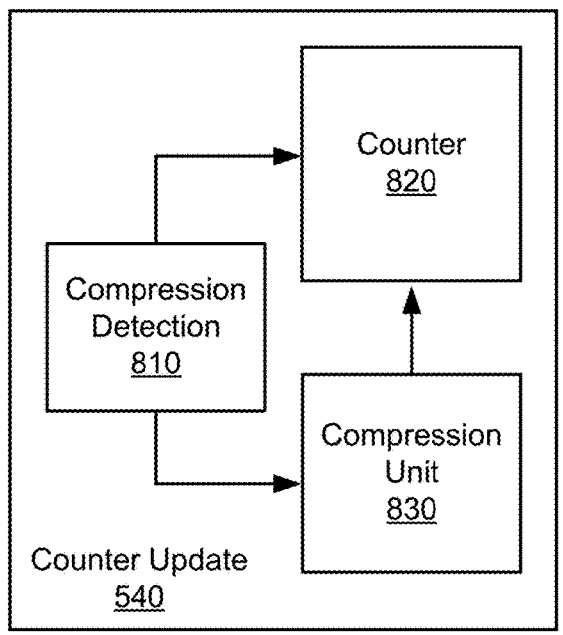
FIG. 8A shows a block diagram depicting counting in a programmable passive hardware measurement engine, according to some examples.

Referring now to FIG. 8A, a block diagram depicting counting in a programmable passive hardware measurement engine, according to some examples, is shown. It is appreciated that a counter value may be increased by the actual packet length, as an example. However, incrementing the counter value in this fashion rapidly causes the counter to overflow. As such, the illustrative embodiments employ a multi-stage counting mechanism. In this multi-stage counting mechanism the counter update 540 module may include a compression detection 810 unit, a counter 820 unit, and a compression unit 830. The compression detection 810 unit is configured to determine whether the counter value is to be compressed in order to save space. In some illustrative embodiments, during the initial phase the counter 820 is incremented without compression, therefore the exact value such as the packet length or packet number is committed directly to the counter array, but once it reaches a certain threshold the data is compressed by the compression unit 830 and counter 820 before it is committed to the counter array.

Figure 8B:
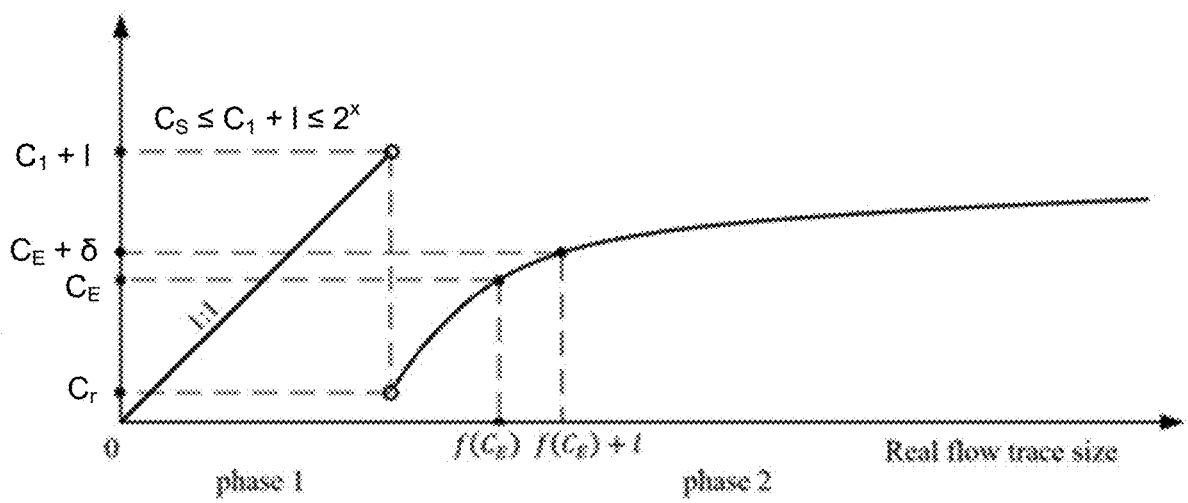
FIG. 8B shows a graphical illustration of counting in a programmable passive hardware measurement engine, according to some examples.

Referring now to FIG. 8B, a graphical illustration of counting in a programmable passive hardware measurement engine, according to some examples, is shown. As illustrated, during phase 1 the counter is updated without compression while at phase 2 the counter is update differently and in a compressed fashion.

As illustrated, the count in a new flow starts in phase 1 with initial counter value of zero. In phase 1, the exact value (packet length or packet number) is committed directly to the corresponding counter of the flow. For example, if the first five packets of a flow are with 80, 500, 500, 1500, 1500 bytes, the counter value will be updated in the order of 80, 580, 1080, 2580, 3080. Increasing counter value in phase 1 is 100% accurate but will overflow the counters quickly. As a result, when the counter value in phase 1 is going to exceed a predefined parameter $C_s$, the counter is updated differently and enters phase 2. Thus, before the counter overflows and once the counter reaches a certain count value, a counting compression phase, i.e., counter update phase 2 is triggered. Assume the counter value in phase 1 is $C_S \geq c_1$. If an incoming packet with size l, which makes $C_S \leq c_1 + l \leq 2^x$, the counting switches to phase 2. In phase 2, the corresponding counter of the flow is increased by one with a probability.

$$p(c, l) = \frac{l}{f(c+1) - f(c)}. \quad (1)$$

The function $f(c)$ in (1) is calculated by $$f(c) = \frac{b^c - 1}{b - 1}, b > 1. \quad (2)$$

In addition, as shown in FIG. 2, a counter value renormalization will be triggered when switching from phase 1 to phase 2: counter value will be changed from $(c_1+1)$ to $C_r$. It can be calculated as $$C_r = \begin{cases} \lceil f^{-1}(c_1 + l) \rceil, & \text{with probability of } p_r \\ \lceil f^{-1}(c_1 + l) \rceil - 1, & \text{with probability of } 1 - p_r \end{cases} \quad (3)$$

$$p_r = \frac{c_1 + l - c_s}{f(f^{-1}(c_s) + 1) - f(f^{-1}(c_s))} \quad (4)$$

It is appreciated that in some embodiments, one bit in each flow may be associated with the counter, which serves as an indicator of whether it is in the first or second counting phase. This one-bit flag may be initialized to zero and then set to one when entering the second counting phase. In other words, the one-bit flag is configured to activate phase 1 or phase 2 of counting. After the measurement, if the counting is only within phase 1, the counter value is the flow statistics result; otherwise, the function $f(c)$ defined in (2) is used as the inverse estimate of the flow statistics result for each flow.

It is appreciated that parameter $C_s$ may be used to determine different measurement phases. In some embodiments, $C_s$ may be set as $2^x - L_{max}$, where x is the number of bits to accommodate a counter and $L_{max}$ is the largest packet size. It is appreciated that b is a parameter that controls the compression ratio (defined as $f(2^x)/2^x$) and counting error. The compression rate is defined as the maximum counting value in phase two divided by the maximum counting value with exacting adding like phase 1, which can be computed as $f(2^x)/2^x$, where $f(c)$ is defined in eq. (2). The relative counting error is the ratio of the estimate difference (between real flow size/bytes and estimate) and the real flow size/bytes. It is appreciated that the absolute value of the relative error, which is always positive, is used.

Accordingly, it is appreciated that increasing the counter value by a much smaller value (i.e. compressed value) in the second phase enables the counting result to fit into a limited counter size and that the byte/flow size can be estimated without bias by applying equation (2) above to the counter value.

Figure 8C:
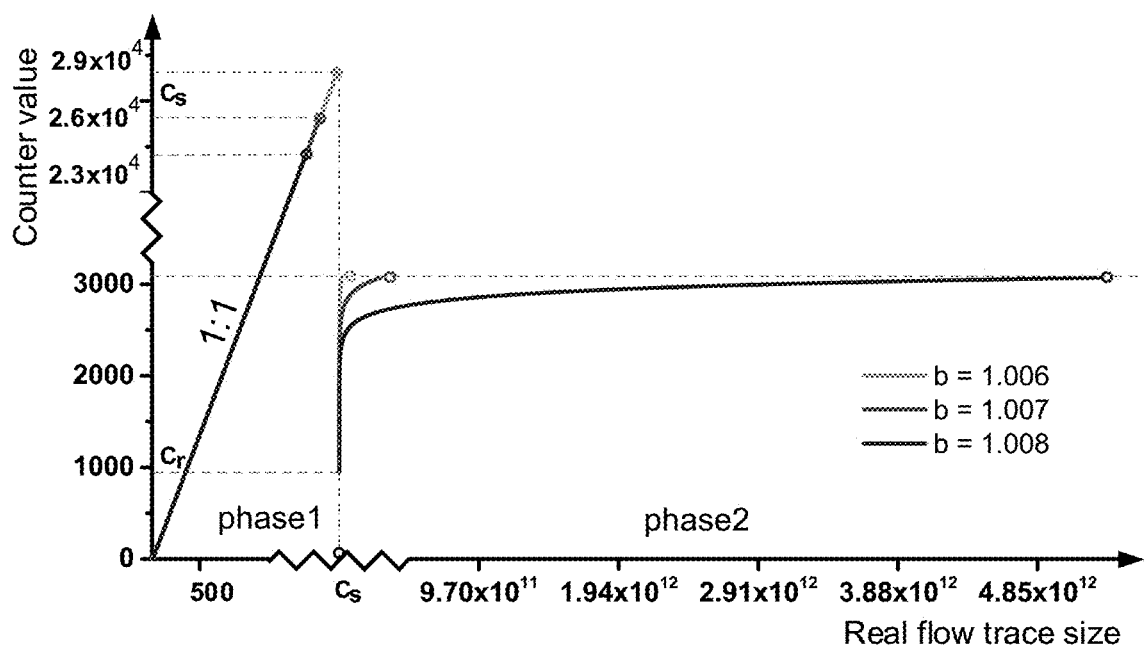
FIG. 8C shows a graphical illustration of counting in a programmable passive hardware measurement engine with various compression factors, according to some examples.

According to some embodiments, increasing b (b>1) increases the compression ratio, but the relative error is enlarged too. As an example, Table 1 as shown below illustrates different compression ratio and estimated errors for different b values as shown in FIG. 8C is shown. In one illustrative embodiment, 1<b<1.05 would be a proper range to address a good tradeoff between compression ratio and relative error.

TABLE 1

| b | Compression ratio | estimate err |
|---|---|---|
| 1.003 | 2.63 | 3.87% |
| 1.004 | 39.7 | 4.47% |
| 1.005 | 637 | 5.00% |
| 1.006 | 1.1*E4 | 5.48% |
| 1.007 | 1.8*E5 | 5.92% |
| 1.008 | 3.2*E6 | 6.32% |
| 1.009 | 5.6*E7 | 6.71% |
| 1.01 | 9.9*E8 | 7.07% |
| 1.05 | 3.3*E68 | 15.80% |

It is appreciated that in order to guarantee accurate inverse estimate, the following equation (5) need to be held by adjusting b.

$$\lceil f^{-1}(f(c)+l) \rceil - c = 1, \forall c \geq C_r, \forall l \leq L_{max} \quad (5)$$

Figure 8D:
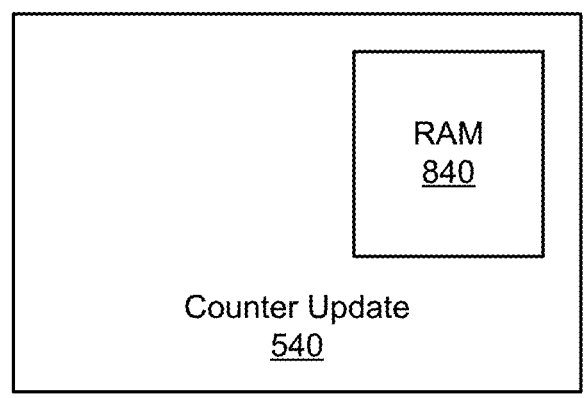
FIG. 8D shows a counter update unit of a programmable passive hardware measurement engine, according to some examples.

Referring now to FIG. 8D, a counter update unit of a programmable passive hardware measurement engine, according to some examples is shown. It is appreciated that in some embodiments, in order to avoid complex calculations such as the ones setout in equations (1)-(5), a precomputed table may be used for counting in phase 2. It is appreciated that the precomputed values may be stored in a RAM 840 within the counter update 540.

The pre-computed table stored in the RAM 840 maintains the value of $$\frac{MAXNUM}{f(c+1) - f(c)}, \text{ where MAXNUM} = 2^x$$

is the largest number could be represented by the system. Since $f(c+1)-f(c)$ is between one and MAXNUM (c is an integer), the value of $$\frac{\text{MAXNUM}}{f(c+1)-f(c)}$$

in the pre-computed table, denoted as PT(c), is also between one and MAXNUM. When the counter value in the second counting phase needs to be updated, a random value between zero and MAXNUM is generated: If it is smaller than PT(c), the counter size will be increased by one, otherwise the counter size remains as before.

Accordingly, a novel architecture for measuring passive network measurements is provide at network in-line rate. Moreover, the architecture provides a mechanism to count to avoid rapid overflow unlike the conventional systems. The flexible programmable architecture supports function changes without a need to pause existing operations for updates. In other words, the flexible programmable architecture, in addition to being fast and efficient, supports programming for network measurements in the control plane that target a network measurement architecture in the data plane. As such, the proposed architecture decouples the interface of the control plane from that of the data plane of the network measurement functions.

Figure 9:
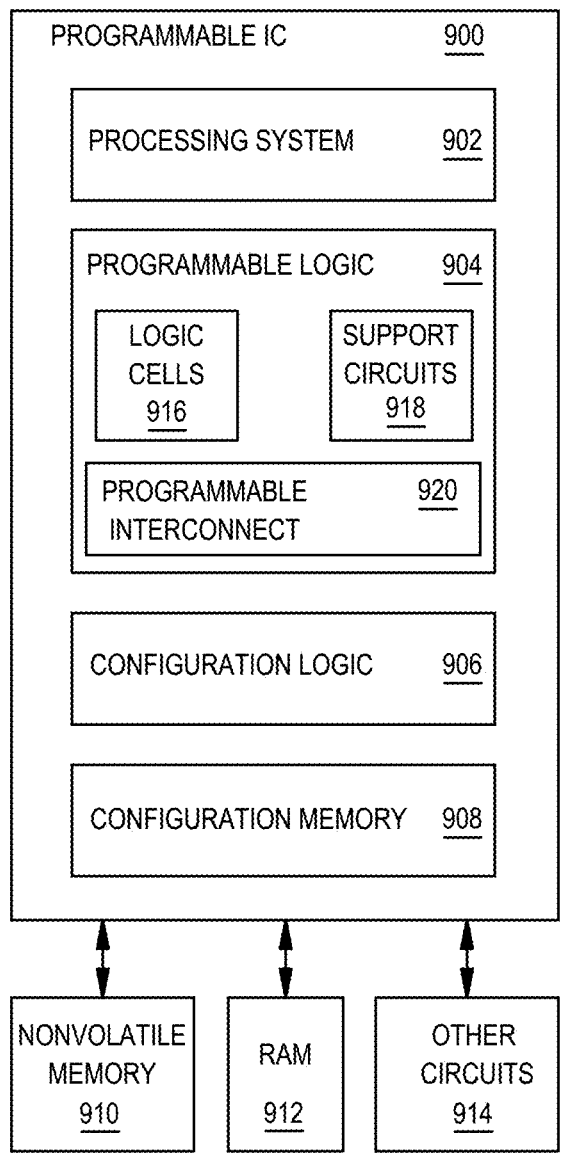
FIG. 9 is a block diagram depicting a programmable integrated circuit (IC), according to some examples.

FIG. 9 is a block diagram depicting a programmable integrated circuit (IC) 900 according to an example. The programmable IC 900 can implement the integrated circuit (IC) chip of systems of FIGS. 1-8D, in whole or in part. The programmable IC 900 includes a processing system 902, programmable logic 904, configuration logic 906, and configuration memory 908. The programmable IC 900 can be coupled to external circuits, such as nonvolatile memory 910, RAM 912, and other circuits 914.

In the example of FIG. 9, the processing system 902 can include microprocessor(s), memory, support circuits, IO circuits, and the like. The programmable logic 904 includes logic cells 916, support circuits 918, and programmable interconnect 920. The logic cells 916 include circuits that can be configured to implement general logic functions of a plurality of inputs. The support circuits 918 include dedicated circuits, such as transceivers, input/output blocks, digital signal processors, memories, and the like. The logic cells and the support circuits 918 can be interconnected using the programmable interconnect 920. Information for programming the logic cells 916, for setting parameters of the support circuits 918, and for programming the programmable interconnect 920 is stored in the configuration memory 908 by the configuration logic 906. The configuration logic 906 can obtain the configuration data from the nonvolatile memory 910 or any other source (e.g., the RAM 912 or from the other circuits 914).

Figure 10:
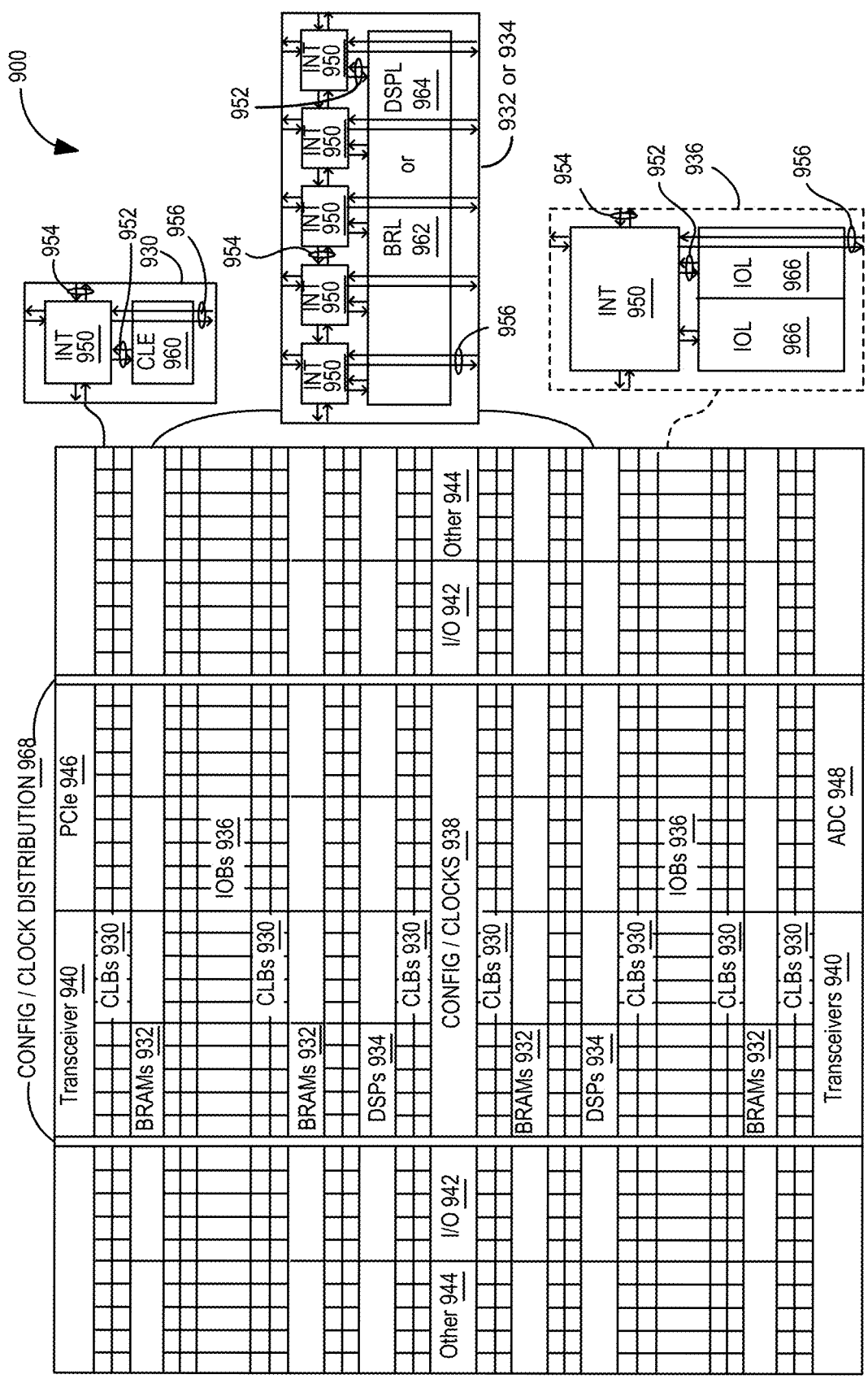
FIG. 10 is a field programmable gate array (FPGA) implementation of the programmable IC, according to some examples.

FIG. 10 illustrates an FPGA implementation of the programmable IC 900 that includes a large number of different programmable tiles including configurable logic blocks ("CLBs") 930, random access memory blocks ("BRAMs") 932, signal processing blocks ("DSPs") 934, input/output blocks ("IOBs") 936, configuration and clocking logic ("CONFIG/CLOCKS") 938, digital transceivers 940, specialized input/output blocks ("I/O") 942 (e.g., configuration ports and clock ports), and other programmable logic 944 such as digital clock managers, system monitoring logic, and so forth. The FPGA can also include PCIe interfaces 946, analog-to-digital converters (ADC) 948, and the like.

In some FPGAs, each programmable tile can include at least one programmable interconnect element ("INT") 950 having connections to input and output terminals 952 of a programmable logic element within the same tile, as shown by examples included in FIG. 9. Each programmable interconnect element 950 can also include connections to interconnect segments 954 of adjacent programmable interconnect element(s) in the same tile or other tile(s). Each programmable interconnect element 950 can also include connections to interconnect segments 956 of general routing resources between logic blocks (not shown). The general routing resources can include routing channels between logic blocks (not shown) comprising tracks of interconnect segments (e.g., interconnect segments 956) and switch blocks (not shown) for connecting interconnect segments. The interconnect segments of the general routing resources (e.g., interconnect segments 956) can span one or more logic blocks. The programmable interconnect elements 950 taken together with the general routing resources implement a programmable interconnect structure ("programmable interconnect") for the illustrated FPGA.

In an example implementation, a CLB 930 can include a configurable logic element ("CLE") 960 that can be programmed to implement user logic plus a single programmable interconnect element ("INT") 950. A BRAM 932 can include a BRAM logic element ("BRL") 962 in addition to one or more programmable interconnect elements. Typically, the number of interconnect elements included in a tile depends on the height of the tile. In the pictured example, a BRAM tile has the same height as five CLBs, but other numbers (e.g., four) can also be used. A signal processing block 934 can include a DSP logic element ("DSPL") 964 in addition to an appropriate number of programmable interconnect elements. An IOB 936 can include, for example, two instances of an input/output logic element ("IOL") 966 in addition to one instance of the programmable interconnect element 950. As will be clear to those of skill in the art, the actual I/O pads connected, for example, to the input/output logic element 966 typically are not confined to the area of the input/output logic element 966.

In the pictured example, a horizontal area near the center of the die is used for configuration, clock, and other control logic. Vertical columns 968 extending from this horizontal area or column are used to distribute the clocks and configuration signals across the breadth of the FPGA.

Some FPGAs utilizing the architecture illustrated in FIG. 6 include additional logic blocks that disrupt the regular columnar structure making up a large part of the FPGA. The additional logic blocks can be programmable blocks and/or dedicated logic.

Note that FIG. 10 is intended to illustrate only an exemplary FPGA architecture. For example, the numbers of logic blocks in a row, the relative width of the rows, the number and order of rows, the types of logic blocks included in the rows, the relative sizes of the logic blocks, and the interconnect/logic implementations included at the top of FIG. 10 are purely exemplary. For example, in an actual FPGA more than one adjacent row of CLBs is typically included wherever the CLBs appear, to facilitate the efficient implementation of user logic, but the number of adjacent CLB rows varies with the overall size of the FPGA.

While the foregoing is directed to specific examples, other and further examples may be devised without departing from the basic scope thereof, and the scope thereof is determined by the claims that follow.

What is claimed is:

1. A system comprising:
a programmable passive measurement hardware engine configured to collect statistical data, from data transmission at a network line rate, used for network measurement;
a programmable active measurement hardware engine configured to:
generate probe packets; and
collect probe packet responses based on the generated probe packets, wherein the collected probe packet responses are used for the network measurement; and
a configuration engine configured to receive data settings and wherein the configuration engine is further configured to program the programmable passive measurement hardware engine and the programmable active measurement hardware engine with the received data settings.

2. The system of claim 1, wherein the programmable passive measurement hardware engine is configured to identify a protocol field of the data transmission based on type-length-value encoding.

3. The system of claim 1 further comprising a packet filter configured to parse packets of the data transmission and wherein the packet filter is further configured to classify the packets using a hashing, or a binary content-addressable memory (BCAM), or a ternary content-addressable memory (TCAM).

4. The system of claim 1, wherein the programmable passive measurement hardware engine comprises:
a scheduler;
a counter update; and
a counter array,
wherein the scheduler is configured to query the counter array for a counter value, and wherein the counter array is configured to return the counter value to the scheduler, and wherein the scheduler is further configured to send the counter value and a length associated with a packet to the counter update, and wherein the counter update is configured to update a counter value to form an updated counter value and further configured to commit the updated counter value to the counter array.

5. The system of claim 4, wherein the counter update is configured to update the counter value if the counter value is less than or equal to a first amount and wherein the counter update is configured to update the counter value with a probability if the counter value is greater than the first amount.

6. The system of claim 5, wherein the counter update comprises a random access memory (RAM) that stores a precomputed table used to determine whether the counter value should be incremented.

7. The system of claim 5, wherein the updated counter value is incrementing the counter value by a length of a packet or by a number of packets if the counter value is less than or equal to the first amount and wherein the updated counter value is incremented by one with the probability if the counter value is greater than the first amount.

8. The system of claim 7, wherein the scheduler is configured to control switching between a first counter and a second counter of the counter array.

9. The system of claim 4, wherein the counter array comprises a first counter and a second counter, wherein one counter in the counter array is active at any given time to update measurement results for incoming traffic and another counter in the counter array provides measurement results.

10. The system of claim 1, wherein the programmable active measurement hardware engine comprises:
a first memory component configured to store a plurality of templates associated with a plurality of packets, wherein a subset of fields associated with each template of the plurality of templates is filled;
a second memory component configured to store a plurality of tasks associated with a plurality of probe packets;
a task scheduler configured to schedule a timing for generation of the plurality of probes; and
a packet generator configured to generate a probe of the plurality of probe packets based on the timing by modifying a template of the plurality of templates with a task of the plurality of tasks, and wherein the packet generator is further configured to send the generated probe packets.

11. The system of claim 10, wherein the programmable active measurement hardware engine further comprises a probe tracker configured to store a task identifier associated with each generated probe and a time that the generated probe is transmitted.

12. The system of claim 10, wherein the task scheduler is configured to scan a first subset of the plurality of tasks and a second subset of the plurality of tasks in parallel, and wherein the task scheduler is further configured to push a ready task in the first subset to a first queue and a ready task in the second subset to a second queue, and wherein the programmable active measurement hardware engine further comprises an arbiter configured to select between the ready task in the first queue and the ready task in the second queue.

13. The system of claim 10, wherein a template of the plurality of templates is selected from a group consisting of ICMP PING and TCP SYN.

14. The system of claim 1 further comprising a report generation engine configured to receive results from the programmable active measurement hardware engine and the programmable passive measurement hardware engine, and wherein the report generation engine is configured to output the network measurement.

15. A system comprising:
a programmable passive measurement hardware engine configured to collect statistical data, from data transmission at a network line rate, used for network measurement, wherein the programmable passive measurement hardware engine comprises:
a counter update;
a counter array comprising a first counter and second counter; and
a scheduler configured to:
query the counter array for a counter value and to identify an active counter from the first counter and the second counter, wherein the counter array is configured to return the counter value to the scheduler, and wherein the active counter is configured to update measurement results and the other one of the first counter and the second counter is configured to provide measurements results;
send the counter value and a length associated with a packet to the counter update, wherein the counter update is configured to update the counter value to form an updated counter value and further configured to commit the updated counter value to the counter array via the scheduler; and
a configuration engine configured to receive data settings and wherein the configuration engine is further configured to program the programmable passive measurement hardware engine with the received data settings.

16. The system of claim 15 further comprising a packet filter configured to parse packets of the data transmission and wherein the packet filter is further configured to classify the packets using a hashing, or a binary content-addressable memory (BCAM), or a ternary content-addressable memory (TCAM).

17. The system of claim 15, wherein the counter update is configured to update the counter value if the counter value is less than or equal to a first amount and wherein the counter update is configured to update the counter value with a probability if the counter value is greater than the first amount, and wherein the counter update comprises a random access memory (RAM) that stores a precomputed table used to determine whether the counter value should be incremented.

18. A system comprising:
a programmable active measurement hardware engine configured to:
generate probe packets;
collect responses based on the generated probe packets, wherein the collected responses are used for network measurement, wherein the programmable active measurement hardware engine comprises:
a first memory component configured to store a plurality of templates associated with a plurality of packets, wherein a subset of fields associated with each template of the plurality of templates is filled;
a second memory component configured to store a plurality of tasks associated with a plurality of probes;
a task scheduler configured to schedule a timing for generation of the plurality of probes; and
a packet generator configured to generate a probe packet of the plurality of packets based on the timing by modifying a template of the plurality of templates with a task of the plurality of tasks, and wherein the packet generator is further configured to send the generated probe packet; and
a configuration engine configured to receive data settings and wherein the configuration engine is further configured to program the programmable active measurement hardware engine with the received data settings.

19. The system of claim 18, wherein the programmable active measurement hardware engine further comprises a probe tracker configured to store a task identifier associated with each generated probe packet and a time that the generated probe packet is transmitted.

20. The system of claim 18, wherein the task scheduler is configured to scan a first subset of the plurality of tasks and a second subset of the plurality of tasks in parallel, and wherein the task scheduler is further configured to push a ready task in the first subset to a first queue and a ready task in the second subset to a second queue, and wherein the programmable active measurement hardware engine further comprises an arbiter configured to select between the ready task in the first queue and the ready task in the second queue.

* * * * *